Sept. 20, 1971     J. H. McELROY     3,605,628
CONVEYOR TRACK SWITCH

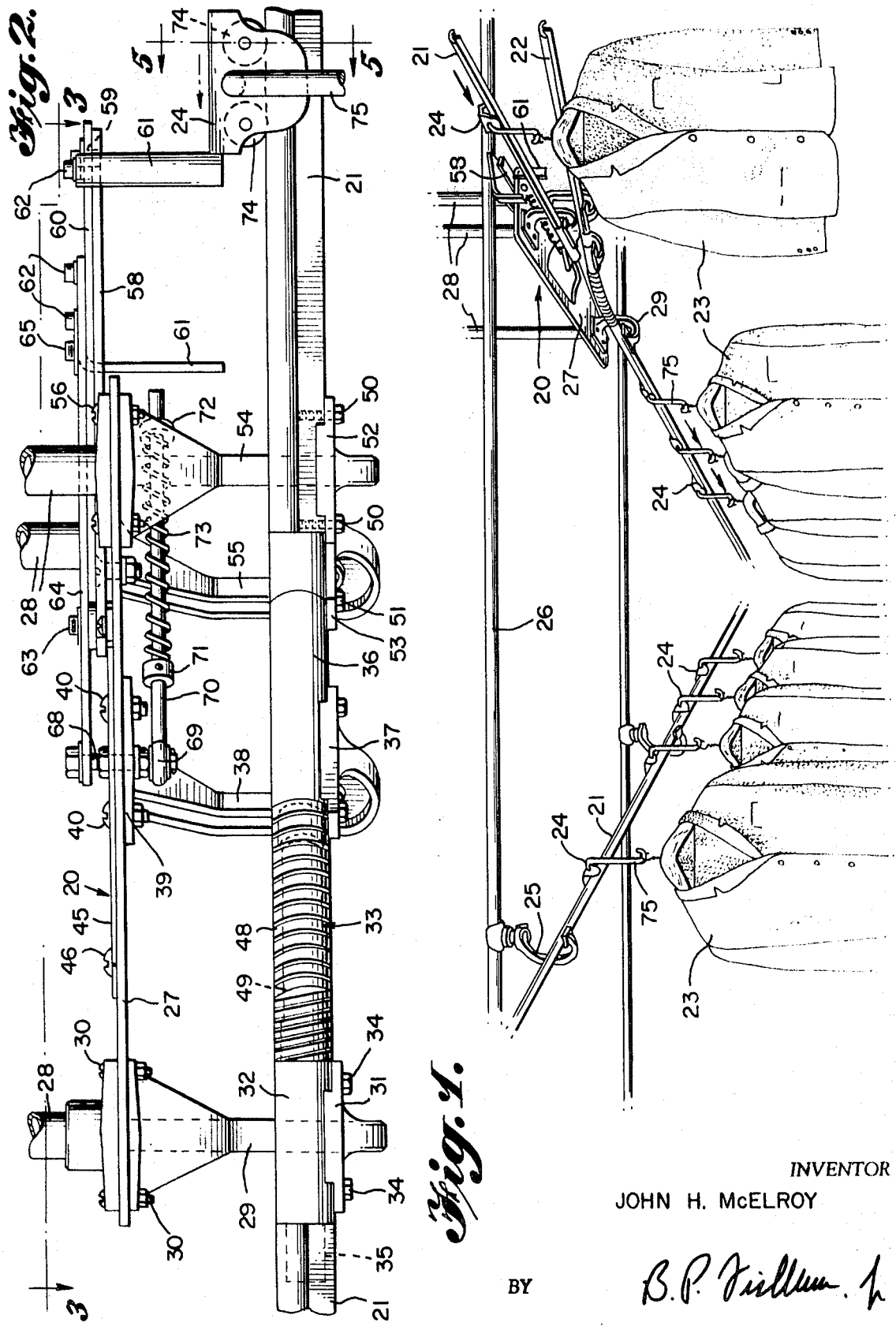

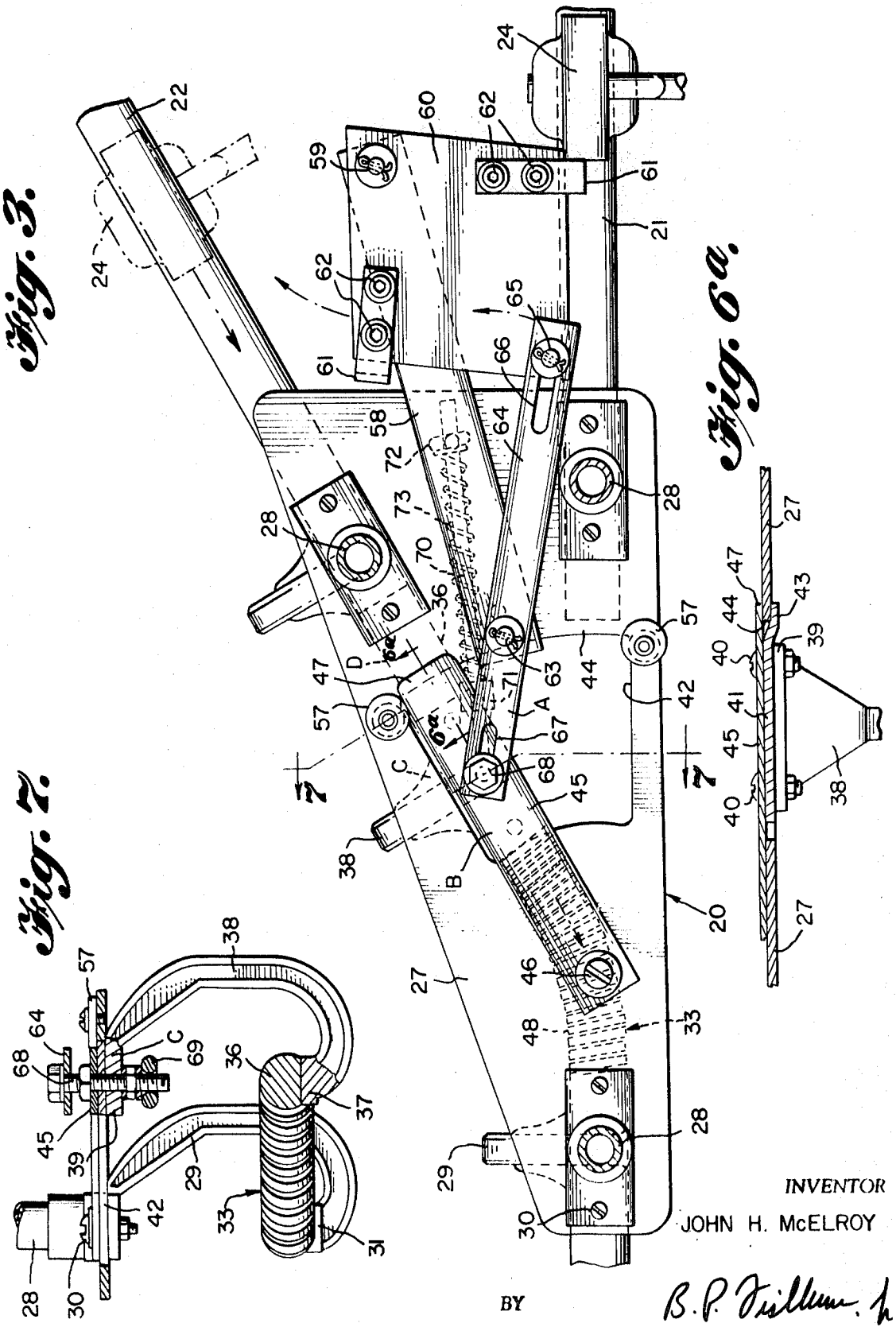

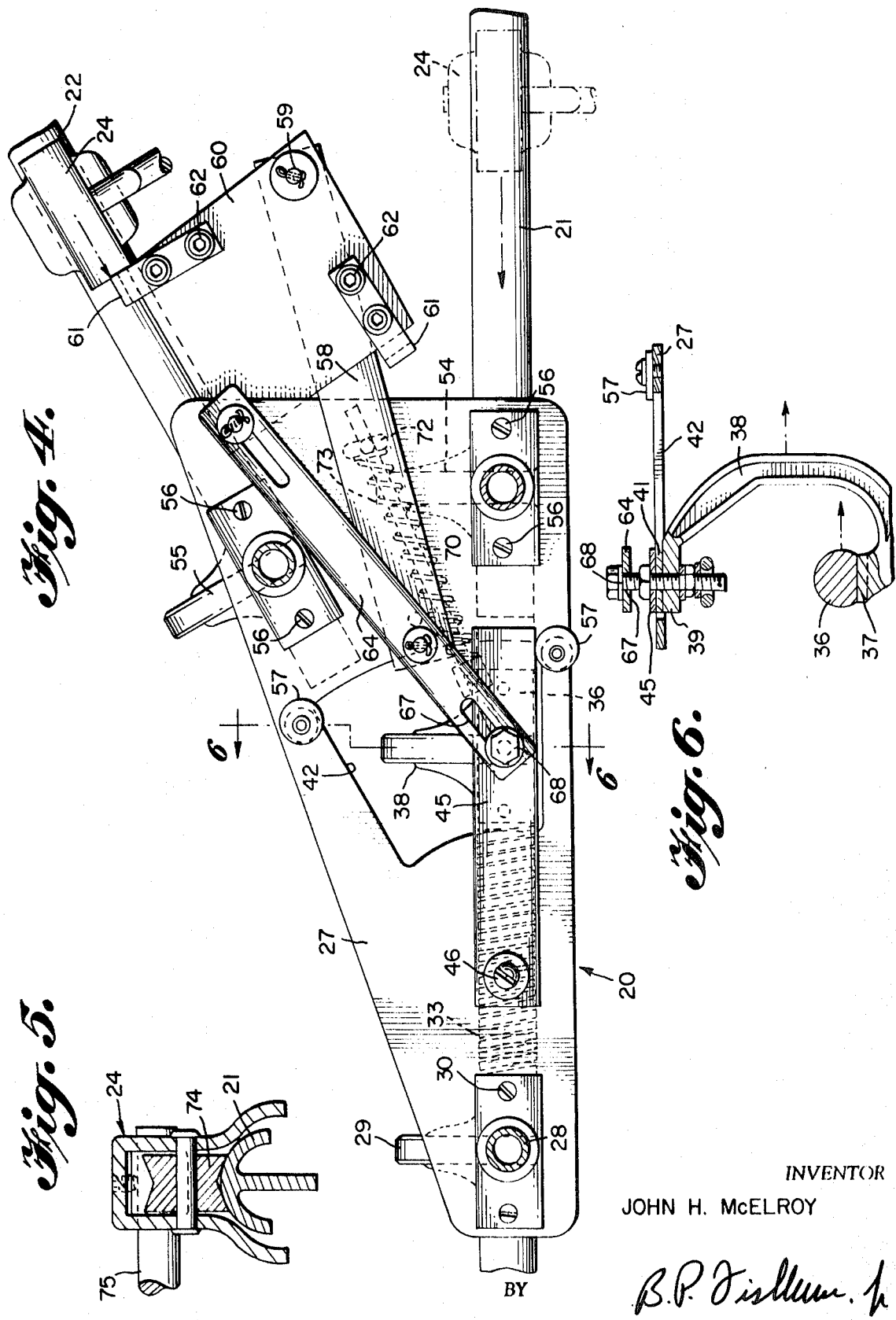

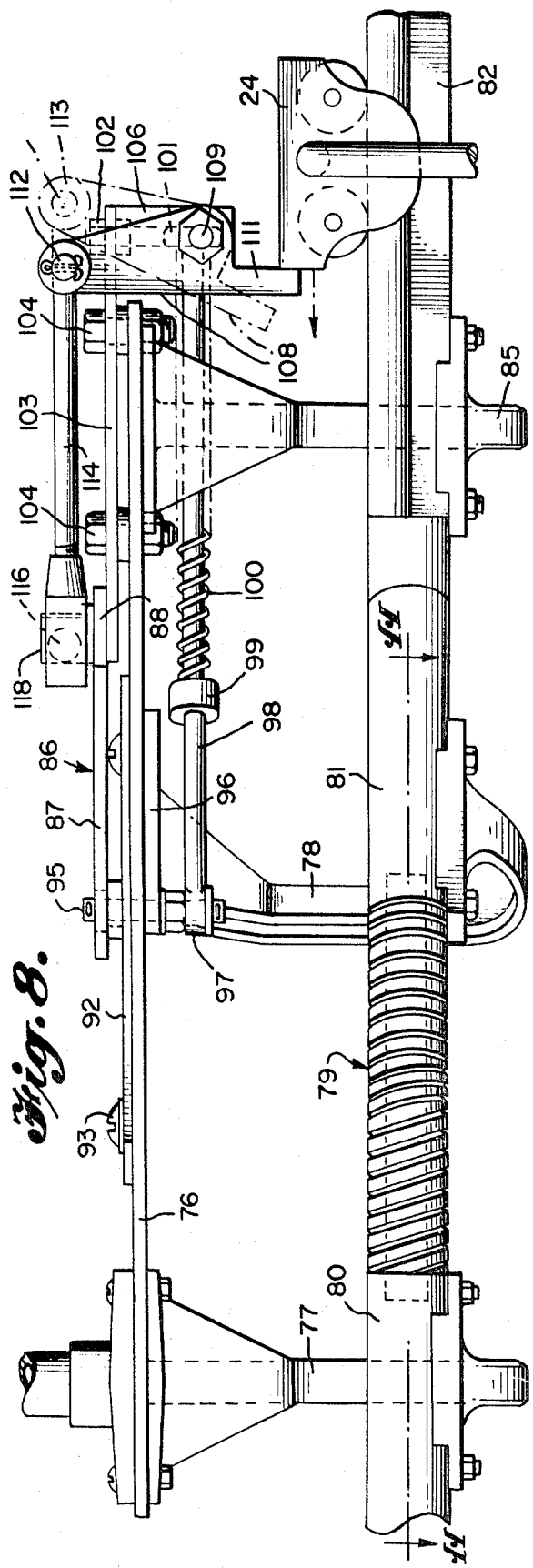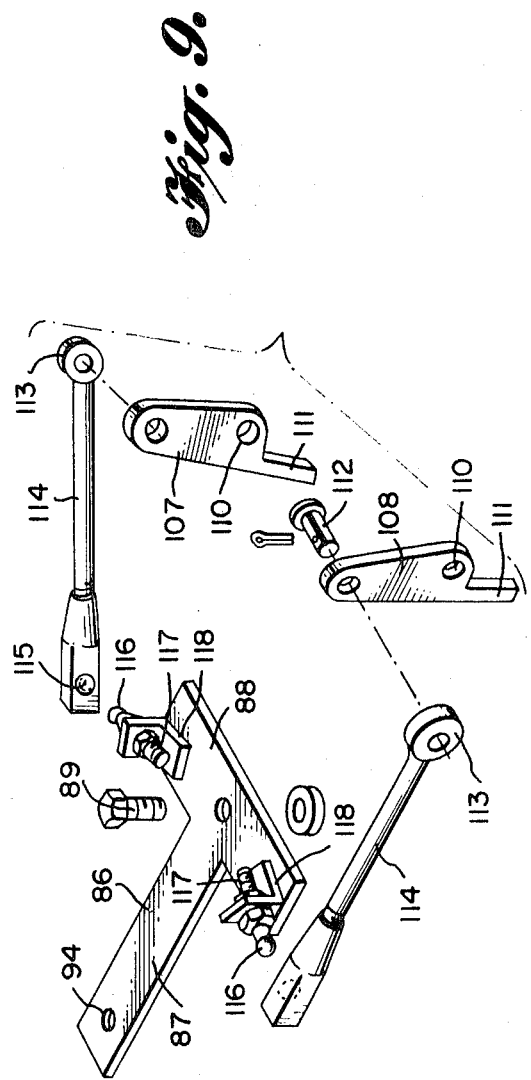

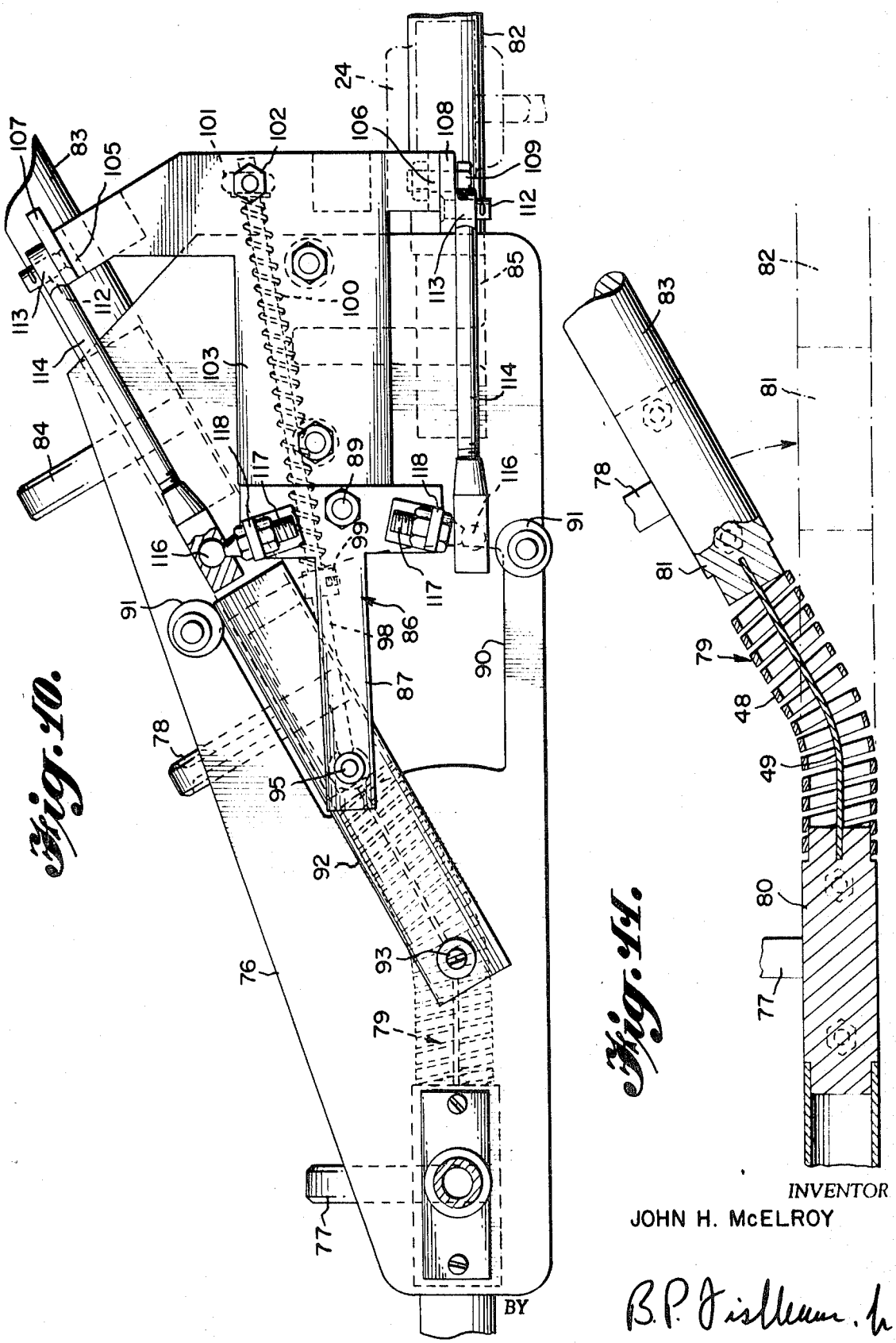

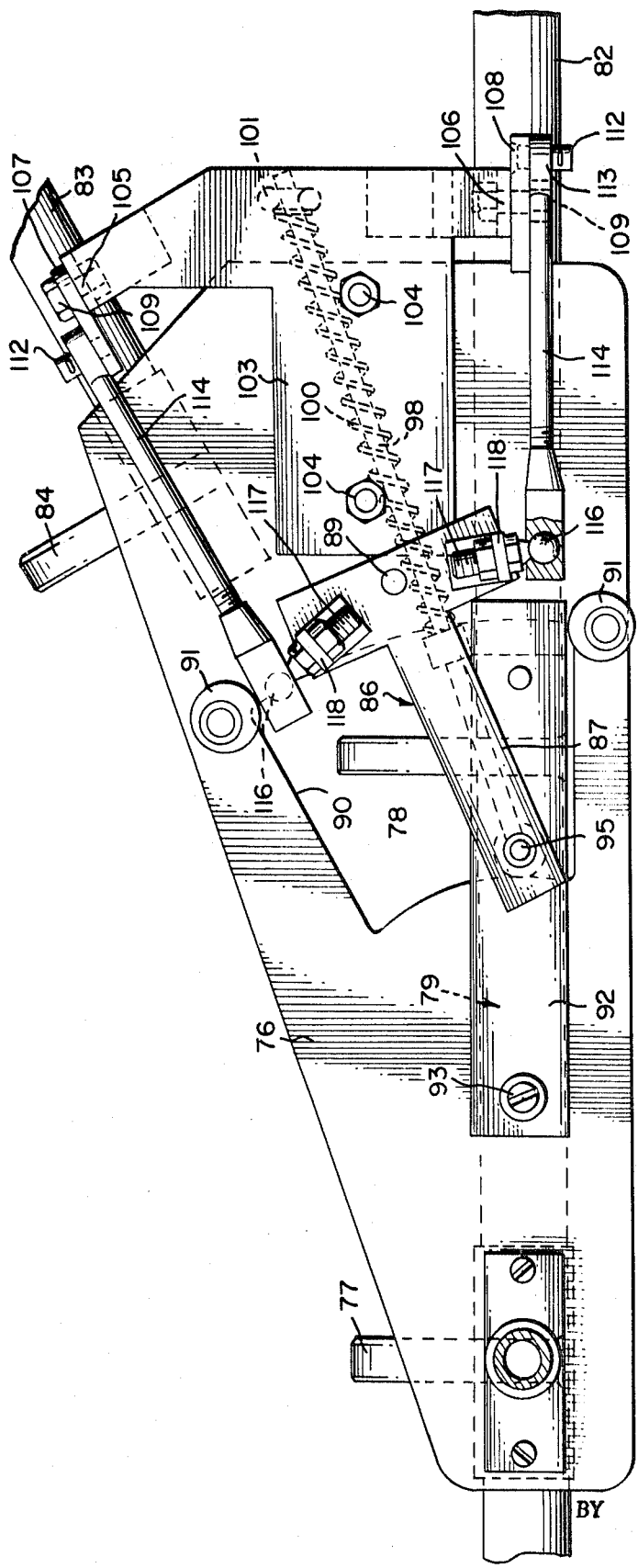

Filed March 22, 1968     8 Sheets-Sheet 7

INVENTOR
JOHN H. McELROY

BY B. P. Fishburn, Jr.
ATTORNEY

INVENTOR
JOHN H. McELROY

BY

ATTORNEY

United States Patent Office 3,605,628
Patented Sept. 20, 1971

3,605,628
CONVEYOR TRACK SWITCH
John H. McElroy, 14 E. Roosevelt Circle,
Red Bank, N.J. 07701
Filed Mar. 22, 1968, Ser. No. 715,414
Int. Cl. B61f 3/00; B61l 11/02
U.S. Cl. 104—103                                      7 Claims

ABSTRACT OF THE DISCLOSURE

A semi-automatic switch mechanism particularly for monorail type trolley conveyor tracks which is characterized by extreme simplicity of construction and operation. The switch takes advantage of the operation of a spring-loaded toggle linkage and a pivoted shifter member struck by a trolley for shifting a flexible switching track section into alignment selectively with either of two angularly disposed track sections, such as a main track section and a branch section.

BACKGROUND OF THE INVENTION

There has long been a need in the art for a simple and economical semi-automatic conveyor track switch which does not require manual operation or completely automatic power operation by means of a motor or the like. In the prior art pertaining to warehouse conveyor tracks, such as monorail trolley conveyor tracks, switches are known which must be shifted or "thrown" manually by an attendant standing on the floor below the switch. This is very awkward and time-consuming and therefore expensive. Proposals have been made for operating the switches automatically by power means, such as motors and associated gearing which are set into action in response to a signal or by the action of an electrical switch or the like. While such completely automatic switches are entirely feasible from a technical viewpoint, they are inherently much more complicated and costly and cannot be justified from an economic standpoint for their intended usage.

The present invention fills the long-felt need of the prior art by the provision of a highly simplified and virtually foolproof semi-automatic switch which is operated at the proper time by the force of a moving trolley which contacts a shifter member of the switch which is in the path of movement of the trolley. No motor or other expensive switch gear is required and no direct manual operation is involved. The invention switch is ideally suited for monorail type trolley conveyors of the kind commonly utilized in garment warehouses, the laundry industry, meat industry and for conveying automobile tires and other articles.

SUMMARY OF THE INVENTION

In accordance with the invention, the track switch constitutes a self-contained unit which is readily installable at various points in the conveyor track system, utilizing existing supporting structures. The switch assembly involves a main mounting plate carrying all of the components including the flexible track section, spring-loaded toggle mechanism and the pivoted shifter means adapted to be struck by a trolley traveling on either the branch or main track. A switch is provided which is stable in either of two positions after completion of the switching operation semi-automatically by contact with a moving trolley. The structure also involves accurate adjustable limit stops which define the limits of movement of the toggle switching mechanism in opposite directions so that the flexible switch section will be properly positioned in alignment with the main track or branch track.

BRIEF DESCRIPTION OF THE DRAWINGS

FIG. 1 is a fragmentary perspective view of a warehouse monorail trolley conveyor system including one track switch embodying the present invention, with parts omitted for simplicity of illustration;

FIG. 2 is a side elevation of the track switch in one stable position thereof as one trolley is about to engage and actuate a pivoted shifter device;

FIG. 3 is a plan view of the switch taken on line 3—3 of FIG. 2, with parts in section;

FIG. 4 is another plan view of the switch after the same has been shifted to the second stable position;

FIG. 5 is a fragmentary enlarged vertical section taken on line 5—5 of FIG. 2;

FIG. 6 is a similar vertical section taken on line 6—6 of FIG. 4;

FIG. 6a is a fragmentary vertical section taken on line 6a—6a of FIG. 3;

FIG. 7 is a fragmentary vertical section taken on line 7—7 of FIG. 3;

FIG. 8 is a side elevational view, similar to FIG. 2, showing a modification;

FIG. 9 is an exploded perspective view showing parts of the modified switch operating mechanism;

FIG. 10 is a plan view of the switch shown in FIG. 8;

FIG. 11 is a fragmentary horizontal section through the flexible track section taken on line 11—11 of FIG. 8;

FIG. 12 is another plan view of the modified switch shown in its second stable position after switching in response to engagement by a moving trolley;

DESCRIPTION OF THE PREFERRED EMBODIMENTS

Figure 13:
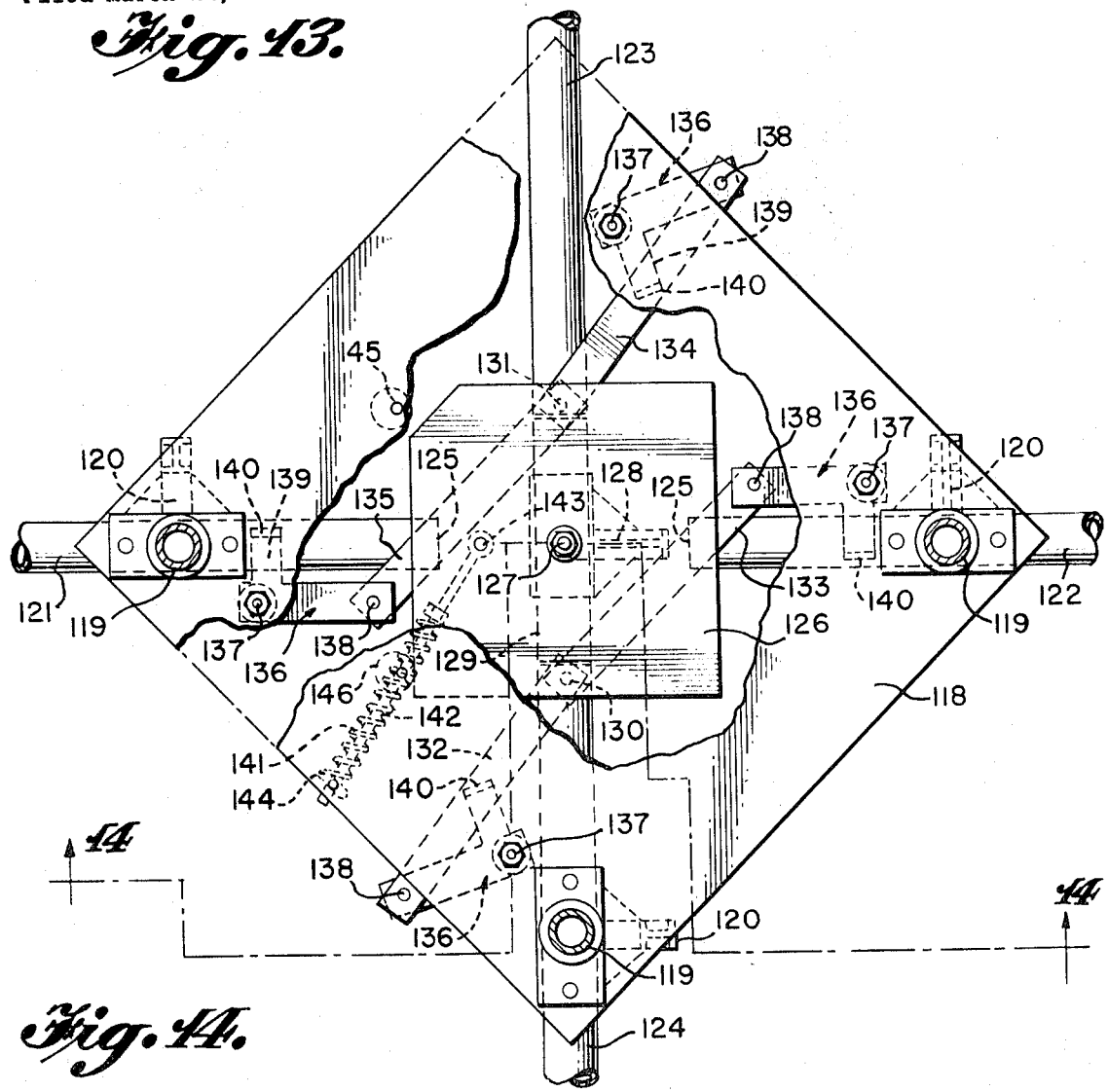
FIG. 13 is a plan view, partly broken away, showing a modification of the invention pertaining to a crossover mechanism for trolley conveyor tracks which intersect at right angles.
Figure 14:
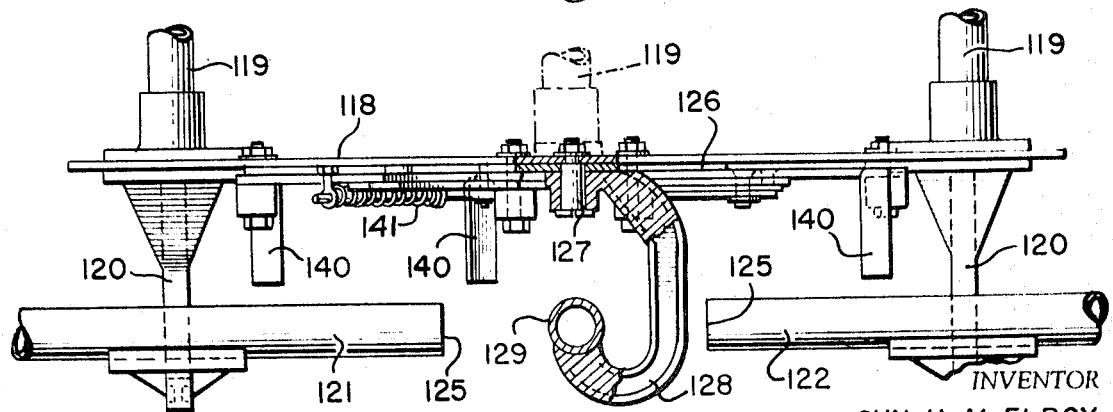
FIG. 14 is an elevational view of the mechanism taken on line 14—14 of FIG. 13.

Referring to the drawings in which like numerals designate like parts, attention being directed first to FIGS. 1 through 7, the numeral 20 designates a self-contained, semi-automatic conveyor track switch assembly embodying the invention in a preferred form thereof. FIG. 1 shows the switch assembly installed at a typical junction where a main track section 21 intersects with a branch track section 22 of the system. It will be understood that the conveyor system may utilize many of the switch assemblies in a large warehouse or the like. The tracks are suspended from the ceiling by conventional support means and are at a proper elevation above the floor to enable attendants to push the garments 23, or other articles, along the various track sections together with the supporting trolleys 24 which roll along on the track sections. As shown in FIG. 1, the various track sections of the system are rigidly supported horizontally by suitable hanger brackets 25 secured to various overhead bars 26 forming parts of the suspension structure which may be varied to meet the needs of particular installations.

FIGS. 2–7 inclusive illustrate the details of one switch unit 20, it being understood that the system employs any desired number of the units which are identical. As shown in these figures, each switch assembly or unit 20 comprises a main flat mounting plate 27 which is tapered as shown to conform generally to the angular convergence of the associated main track section 21 and a branch track section 22, previously identified. The mounting plate 27 is supported rigidly from its top by vertical hanger bars 28 which constitute parts of the track system supporting means shown in FIG. 1.

Adjacent the narrow end of the plate 27, a first depending hanger bracket 29 is rigidly secured to the mounting plate 27 by fastener means 30 which may be the same means employed to connect the mounting plate with the adjacent hanger bar 28. The hanger bracket 29 includes a saddle 31 near its bottom and spaced a considerable distance below the plate 27 for the support of a solid or rigid portion 32 of a flexible track section 33. The rigid portion 32 is secured within the saddle 31 by suitable fastener elements 34 or screws. The rigid portion 32 includes a reduced nose 35 for coupling engagement with the adjacent terminal of main track section 21 so as to produce a continuous track.

The flexible track section 33 at its other end includes a rigid terminal portion 36, likewise rigidly secured to the saddle 37 of a movable hanger bracket 38. The top plate 39 of movable bracket 38 is bolted as at 40 to a spacer element 41, FIG. 6a, operating within a large arcuate slot 42 formed through the mounting plate 27 to allow the necessary movement of the hanger bracket 38 and associated parts during the switching operation. As shown in FIG. 6a, the element 41 has a lip extension 43 at one end thereof engaging slidably beneath the mounting plate 27 along the arcuate edge 44 of the through slot 42. This serves to guide the movement of the bracket 38 and the flexible track section 33 during the shifting of the switch from one stable position to the other.

Immediately above the mounting plate 27 and the spacer element 41 is a first pivoted toggle link 45 having one end thereof pivoted at 46 to the mounting plate 27 for horizontal swinging movement across the top thereof. As shown in FIGS. 3 and 6a, the toggle link 45 spans the arcuate slot 42 and has a forward lip 47 overlapping the arcuate edge 44 to form a guide along such edge and above the lip 43 to further stabilize the switching operation. The pivot point 46 for the link 45 is on the longitudinal axis of main track section 21 and this is also the axis of rigid terminal portion 32. The saddle 37 and the other terminal portion 36 of flexible track section 33 lie directly below the toggle link 45 in a common vertical plane therewith and these elements swing horizontally in unison during the switching operation, to be further described. The flexible track section 33 includes an intermediate coil spring portion 48 between the rigid terminal portions 32 and 36 and an internal flexible connecting element 49 as detailed in FIG. 11.

The shiftable terminal portion 36 of the flexible track section is adapted for accurate alignment with corresponding ends of the main and branch track sections 21 and 22. These latter track sections are rigid and the end portions thereof are secured at 50 and 51 to the saddles 52 and 53 of an additional pair of hanger brackets 54 and 55 dependingly secured rigidly as by bolt means 56 to the main mounting plate 27. Thus, the terminal ends of main and branch track sections 21 and 22 are held securely in position to be aligned at the proper times with the shiftable portion 36 of the flexible track section.

To assure accurate alignment of these elements when the switching operation takes place, a pair of readily adjustable eccentric stop discs 57 are mounted upon the plate 27 at the opposite sides of the slot 42 and projecting slightly inwardly of the margins of the slot so that the stop discs may contact the opposite sides of the pivoted toggle link 45 to arrest the movement of the same in either direction at exactly the proper point to align the terminal portion 36 with one of the track sections 21 or 22.

The switching mechanism further comprises a fixed horizontal support arm 58 rigidly mounted upon the plate 27 and projecting considerably beyond the wider end of the plate into the area between the track sections 21 and 22 and substantially midway between these track sections. Pivotally mounted upon the fixed support arm 58 by a pivot element 59 is a horizontally swingable shifter plate 60 carrying a pair of depending striker elements 61 rigid therewith and secured thereto at 62. As shown in FIG. 3, the striker elements 61 are spaced apart approximately 90 degrees and they extend downwardly for a substantial distance below the plate 27 although terminating above track sections 21 and 22 and flexible track section 33. The striker elements 61 are adapted to lie in the path of movement of trolleys 24 on the main and branch track sections and in the two stable positions of the switch; one striker element is always positioned in the path of one trolley whereas the other striker element will then be clear of the trolley which is ready to pass through the switch, FIGS. 3 and 4.

Pivoted between its ends at 63 to the inner end of support arm 58 and lying above the same is a shifter or toggle link 64 having a slotted pivotal connection at 65 and 66 with one corner of the shifter plate 60 whereby turning of the shifter plate on its pivot 59 by a trolley engaging one of the striker elements 61 will produce a turning of the toggle link 64 upon its pivot 63. The other end of toggle link 64 has a slotted pivotal connection at 67 and 68 with the previously-described underlying toggle link 45 between the ends of the latter and about one-half way across arcuate slot 42, longitudinally of the plate 27. Thus turning of the slotted toggle link 64 on the pivot 63 responsive to the shifter plate 60 will produce a corresponding swinging or turning of the link 45 on its pivot 46 so as to move the hanger bracket 38 and the terminal portion 36 of the flexible track section anchored to it.

The pivot element 68 extends downwardly below the mounting pad of bracket 38 and receives thereon pivotally an open head or eye 69 of a spring supporting rod 70 having an adjustable spring positioning collar 71 rigidly mounted thereon. The rod 70 extends slidably through a fixed supporting eye 72 on the bottom of mounting plate 27 and a rather stiff compressible coil spring 73 engages over the rod 70 and has its two ends bearing against the collar 71 and the eye 72. The tension of the spring may be regulated by adjusting the collar 71 along the rod 70 and locking it with a set screw or the like.

Pivoting of the link 45 and consequent lateral movement of the pivot element 68 through the slot 42 shifts the adjacent end of the rod 70 and causes the rod to pivot and slide longitudinally during the switching operation. When the switching operation takes place through the toggle mechanism due to one of the trolleys 24 engaging one of the strikers 61 to turn the elements 60, 64 and 45 upon their pivots, the resulting movement of the rod 70 through the eye 72 will compress the spring 73 until the linkage reaches a dead center condition midway between the stops 57 and where the links 45 and 64 are in longitudinal alignment with each other and also parallel to the rod 70. At this dead center position, the spring 73 will store maximum energy and will instantly release this energy when the linkage passes dead center in either direction to snap the switch quickly toward either stop 57 and thereby move the terminal portion 36 of the flexible track section to either one of its stable positions.

FIG. 5 shows the constructional detail of one form of trolley, previously designated 24. This trolley contains a pair of track-engaging rollers 74 and includes an arm 75 for the support of garment hangers or the like. A preferred cross sectional configuration for the track sections of the conveyor system is also shown in FIG. 5. However, the switch unit constituting the invention may be employed with main and branch track sections of various shapes and is not limited in this regard.

In light of the foregoing description, the operation of the switch in FIGS. 1 to 7 requires little if any further clarification. It should be pointed out, however, that the spring-loaded toggle linkage will always hold the terminal portion 36 in proper alignment with one or the other of the track sections 21 or 22. The link 45 will therefore always be against one of the two stops 57 with the switch in a stabilized condition. This action likewise maintains one of the strikers 61 properly positioned to be engaged by a trolley 24 while the other striker 61 is held clear of the trolleys on the other track section.

All that the attendant need do to operate the switch in either direction is to propel a group of the articles 23 along the associated track section 21 or 22 and the leading trolley of this group will engage the striker element 61 in its path so as to throw the switch. The resulting turning of the shifter plate 60 responsive to trolley engagement will move the toggle linkage to dead center and thus load the spring 73 whereupon the spring will propel the mechanism automatically to the other stable position so that the flexible track section will be aligned properly with the fixed main track section or branch track, as the case may be. Once the switch is thus thrown or operated, as many trolleys as required may pass through the switch with no further manipulation of the structure. When this work has been completed, a signal may be sounded and articles suspended from trolleys on the other track section 21 or 22 may be propelled into the switch and the engagement of the striker 61 will throw the switch again in the proper direction to shift the terminal portion 36 of the flexible track section into proper alignment to receive the trolleys and carry them through the switch as depicted in FIG. 1. The rollers 74 of each trolley 24 are adapted to roll over the portions 32, 36 and 48 of the flexible track section 33, without difficulty.

Within the scope of the invention, there may be many variations of mechanism for operating the switch through the toggle spring arrangement, above-described. Such variations may include rigid linkages as well as cable and pulley types or chain and sprocket operators.

FIGS. 8 through 12 of the drawings show one modified form of operating linkage for the switch. In these figures, substantially the identical main mounting plate 76 may be employed in conjunction with fixed and movable hanger brackets 77 and 78 for the flexible track section 79 having rigid terminal end portions 80 and 81, as previously described in detail. The association of the modified switch in the conveyor system with main and branch track sections 82 and 83 remain substantially identical to the previous embodiment. Additional fixed hanger brackets 84 and 85 are employed to support the incoming main and branch track sections 82 and 83 in the manner previously described. The same trolleys 24 are employed in conjunction with the modified form of the invention. The full details of all of these parts common to the previous embodiment need not be repeated herein.

Instead of the elements 60, 61, 64 and 45 in the prior embodiment, the modified mechanism employs a T-member or link 86 including longitudinal and transverse portions 87 and 88. The T-member 86 is pivoted near its forward end and center on a pivot element 89, fixed with respect to the mounting plate 76. The mounting plate has a large through slot 90 to allow the required movement of the bracket 78 and associated parts, as in the prior embodiment. Substantially the identical adjustable eccentric stops 91 are mounted on the plate 76 to limit movement of a link 92, corresponding to the link 45, and pivoted at 93 to the mounting plate 76. The longitudinal portion 87 of T-member 86 has a pivotal connection at 94 with a vertical pivot pin 95 which extends downwardly FIG. 8, through the pad 96 of movable hanger bracket 78 and below this pad the pin 95 has a pivotal connection with an eye 97 of a horizontal toggle spring rod 98 carrying an adjustable collar 99 and a compressible coil spring 100 exactly like the previously-described toggle spring 73 and associated parts. The forward end of rod 98 extends slidably and pivotally through another eye 101 fixedly secured at 102 to the mounting plate 76 and positioned below the same. As shown in FIG. 8, the rod 98 operates in a plane below the mounting plate 76 but well above the track sections of the apparatus.

In the modified embodiment, a supporting plate 103 is bolted at 104 to the main mounting plate 76 and has side extensions 105 and 106 to which are pivoted, respectively, operating levers 107 and 108, by means of pivot elements 109, the levers having openings 110 to receive these pivot elements. The levers 107 and 108 have depending extensions 111 in the path of movement of the trolleys 24 and adapted to be engaged thereby or struck when the trolleys are pushed into the switch.

The tops of the levers 107 and 108 are pivotally connected at 112 to the forward ends or eyes 113 of ball joint rods 114 having at their rear ends spherical socket openings 115 for the reception of ball heads 116 forming parts of screw-threaded adjustable connectors 117, fixedly secured to L-brackets 118 rigidly secured to the transverse portion 88 of T-member 86.

The mode of operation of the modified switch is basically the same as for the previous embodiment. When a trolley 24 on either the branch track section 83 or main track section 82 strikes the extension 111 of one of the pivoted levers 107 or 108, such lever turns upon its pivot 109 and the top of the lever pulls the associated rod 114 forwardly causing such rod through its ball and socket connection to turn the T-member 86 on its pivot 89. As in the prior embodiment, at the beginning of the operating cycle, the switch is in one of two stable positions. The turning of the T-member 86 causes the pivot element 95, hanger bracket 78 and associated parts, to swing laterally in one direction within the slot 90 of mounting plate 76. This movement carries the rod 98 with it and the toggle spring 100 and causes the rod to pivot and slide within its supporting eye 101, as the rod moves in a horizontal plane.

As previously described, when the mechanism is at a dead center condition, half-way between the extremes of FIGS. 10 and 12, the spring 100 will be storing maximum energy to snap the terminal portion 81 into alignment with either of the fixed track sections 82 or 83. Once the switch is thrown or shifted, it will remain stable until the next actuation by a trolley on the opposite track section striking the extension 111 of the other pivoted lever which through the associated rod 114 and ball joint connection will pivot the member 86 in the opposite direction to cause throwing of the switch to the second stable position.

When the modified switch is thrown in the described manner, the link 92 is also caused to pivot about its pivot element 93 and the movement of the mechanism is positively arrested at the correct point by engagement of the side edge of link 92 with one of the stops 91. By this means, the terminal portion 81 of the flexible track section may always be properly aligned with either of the two fixed track sections 82 or 83, as in the prior embodiment.

It is now believed that the advantages and economies of the invention will be apparent to anyone skilled in the art without any further description herein. The switch structure is characterized by simplicity and compactness and the structure is rugged and durable. The adjustable stops 57 and 91 enable extremely accurate operation and alignment of the track parts and the toggle spring may have its tension adjusted to vary the sensitivity of the switch. It may be noted from an inspection of FIGS. 2 and 8 that the movable linkage elements occupy very little space in the vertical direction adding to the compactness of the structure. No skill is required to operate the switch.

Referring now to FIGS. 13 through 16, another embodiment of the invention has been illustrated in connection with a crossover mechanism for trolley conveyor tracks which intersect substantially at right angles. As will be fully explained, this mechanism is constructed and operates on substantially the same principle as the preceding switch mechanisms and embodies a primary support plate 118, which may be square as shown, and fixedly supported in the conveyor track system at its four corners by overhead hanger bars 119. Depending hanger brackets 120, rigid with the support plate 118, serve to support the four tracks sections 121, 122, 123 and 124, which are rigid and whose terminal ends 125 are spaced equidistantly from the center of the plate 118. These stationary track sections 121, 122 and 123, 124 are arranged in pairs disposed at right angles with their axial center lines intersecting at the center of the mechanism, FIG. 13. All of the track sections 121 through 124 lie at the same elevation or are in the same horizontal plane below the support plate 118.

A square shifter or switching plate 126 lies close to and beneath the main mounting plate 118 and is pivoted to the main mounting plate for horizontal swinging thereunder by a central vertical pivot element 127, which also carries a depending turning support bracket 128, carrying a short straight rigid crossover track section 129. The plate 126, bracket 128 and track section 129 thus constitute a rigid unit which may turn or pivot about the fixed vertical axis of the pivot element 127 at prescribed times. The length of the crossover track section 129 is such that it may span substantially the full distance between the spaced ends 125 of the pairs of fixed track sections 121 and 122 and 123 and 124 in either of two stabilized operating positions, as shown in FIGS. 13 and 15.

The switching plate 126 has a pair of oppositely arranged pivot elements 130 and 131 near opposite margins thereof and spaced equidistantly from the axis of the central pivot 127. Pivotally secured with each element 130 beneath the plate 126 are shifter links 132 and 133 and 134 and 135, arranged in cooperating pairs as best shown in FIGS. 13 and 15. Substantially L-shaped bell cranks or operators 136 for these links are provided, and each bell crank 136 is pivoted at 137 to the main supporting plate 118. Each bell crank 136 also has a pivotal connection at 138 to one of four shifter links 132, 133, 134 and 135, as shown. Each bell crank 136 includes a lateral arm 139 having a dependent striker extension 140, adapted for positioning in the path of travel of a conveyor trolley moving on one of the intersecting tracks.

Figure 15:
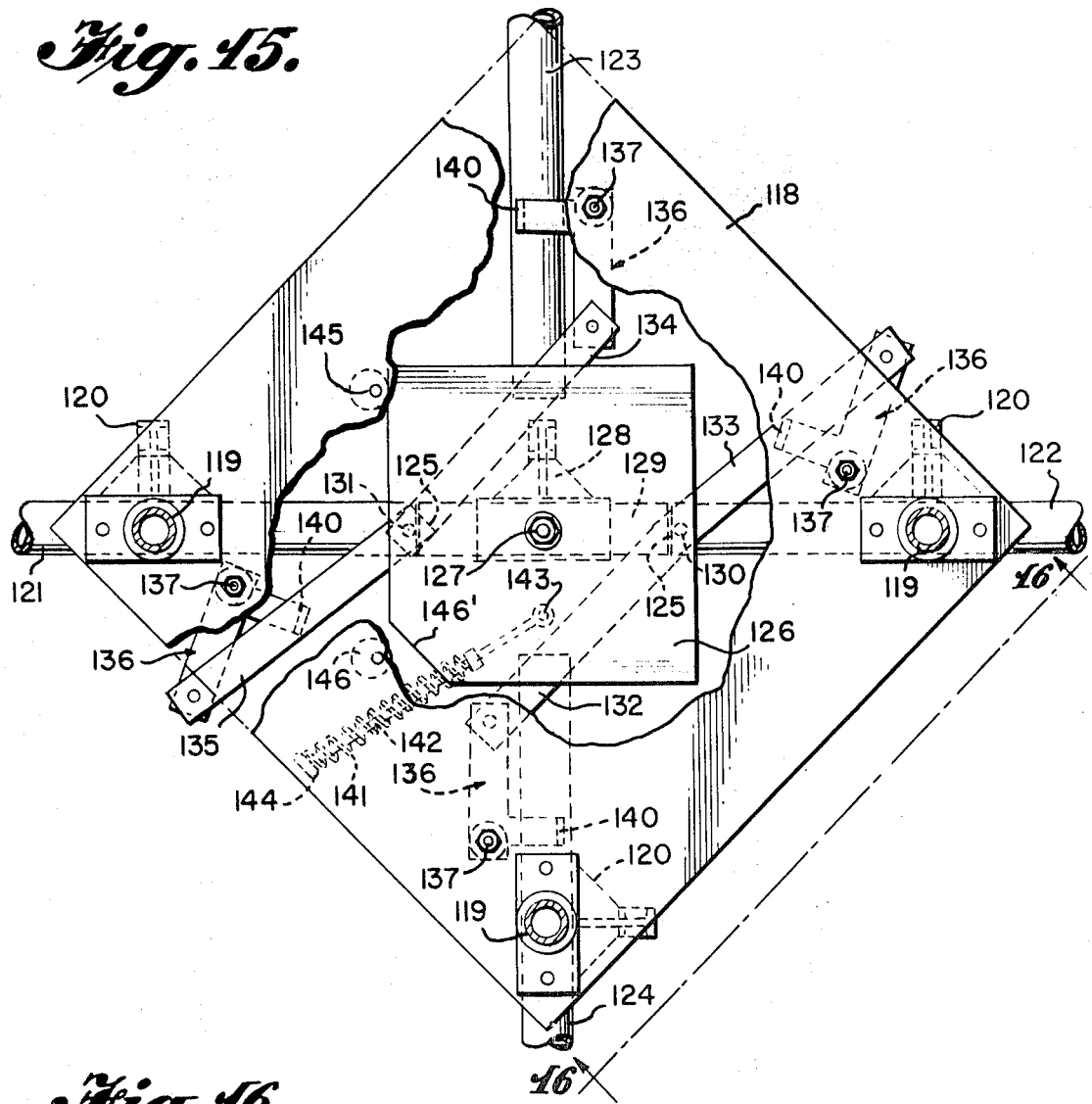
FIG. 15 is a plan view similar to FIG. 13 showing the crossover mechanism in the second of its two stabilized positions.
Figure 16:
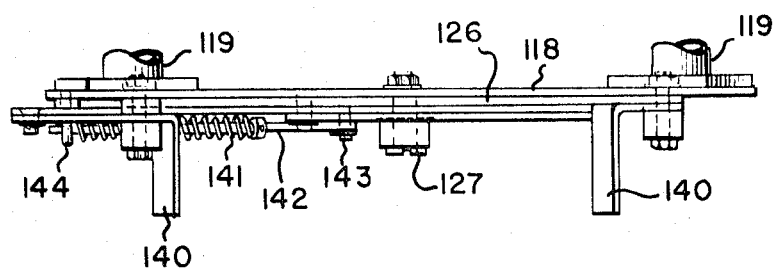
FIG. 16 is an elevational view of the mechanism taken on line 16—16 of FIG. 15.

As shown in FIGS. 13 and 15, there are in effect two mechanical linkages connected with the two pivots 130 and 131 of shifter plate 126. One of these linkages includes the links 132 and 133 and a pair of the bell cranks 136. The other linkage includes the links 134 and 135 and a pair of the bell cranks 136. Each of the two linkages has a striker element 140 to be engaged by a trolley traveling on each of the intersection right angular paths or tracks. When the crossover mechanism is in one stabilized position as shown in FIG. 13, two of the striker elements 140 will be in active positions for being struck by a trolley moving in either direction along one path, whereas the other two striker elements 140 will be swung aside to inactive positions and out of the path of trolleys traveling on the other track of the right angular intersecting pair.

The two linkages and the pivoted shifter plate 126 are biased as in the prior forms of the invention by a toggle spring 141, surrounding a rod 142, lying in a horizontal plane below the plate 126 and having a pivotal connection at 143 with the shifter plate 126. The rod 142 has sliding engagement within a guiding eye or loop 144 similar to the eye 101 and 72 of the prior embodiments. The guiding eye 144 is anchored to the support plate 118. The pivot point 143 for the rod 142 of the toggle spring unit is spaced equidistantly from the pivots 130 and 131 and is also spaced to one side of the central pivot 127.

A pair of adjustable eccentric stop discs 145 and 146 similar to the previously-described elements 57 are mounted on the bottom side of support plate 118 at the elevation of the shifter plate 126 so as to engage this plate at two diagonally opposite corners thereof to positively limit the pivoting movement of the plate 126 at the two stable positions of the mechanism shown in FIGS. 13 and 15. One corner of the plate 126 is cut-away at 146' so that the plate may clear the adjacent stop element 145 when turning from one adjusted position to the other, as shown in FIGS. 13 and 15. When this turning movement occurs due to a trolley traveling in one direction on one of the two right angular track paths engaging a striker element 140, the associated linkage will cause the shifter plate 126 to pivot ninety degrees on the center pivot 127, toward or from one of the stable positions of the mechanism shown in FIGS. 13 and 15. During this pivoting movement, the toggle spring 140 will be compressed and will move to and beyond a dead center position where the pivot points 127 and 143 are in alignment. Upon passing this dead center position, the spring 141 will release energy and drive the plate 126 to the second stable position where one corner of the plate will engage one of the adjustable stops 145 or 146. The toggle spring will have enough energy stored in it to maintain the mechanism firmly in either of its stable positions shown in FIGS. 13 and 15. The maximum energy position of the spring 141 is when the spring and its rod 142 are in a dead center condition with respect to the center pivot 127.

It may now be seen that the mode of operation of the crossover unit is essentially the same as the operation of the previously-described switch mechanism. The short rigid connecting track section 129 being bodily carried by the bracket 128 will always turn ninety degrees with the shifter plate 126, responsive to engagement with a trolley on one of the main paths with one of the two striker elements 140 in such path. When this contact occurs and the plate 126 and associated parts are shifted, the track section 129 will turn and become aligned with the two main track sections of either right angular path, and will fill in the gap between the terminal ends 125 of the main track sections so that the particular trolley may pass through the crossover point successfully. The same action takes place automatically when another trolley approaches the crossover mechanism on the second right angular path, because after one shifting of the mechanism, the other pair of striker elements 140 will then be aligned for engagement with a trolley moving on said second path. FIGS. 13 and 15 show the two main paths and the two stable conditions of the mechanism allowing trolleys to pass in either right angular direction. It is believed that the construction and operation of this form of the invention should now be clear without any further description.

It is to be understood that the forms of the invention herewith shown and described are to be taken as preferred examples of the same, and that various changes in the shape, size and arrangement of parts may be resorted to.

I claim:

1. A switching mechanism for a trolley conveyor track system wherein the mechanism is operated solely by contact with the trolley moving on the track system and is therefore free of manual control, said mechanism comprising a stationary support member, converging main and branch track terminals fixedly secured to the support member in spaced relation, a switching track section having one terminal end fixed to the support member and having an opposite terminal end movable selectively into alignment with either the main or branch track terminals, the switching track section having an intermediate portion adapted to flex readily during movement of said opposite terminal end and capable of imparting to the switching track section a straight or curved configuration, a spring-loaded over-dead-center operating linkage for said opposite terminal end of the switching track section having a connection with the support member and with said opposite terminal end, a pivoted operator for said linkage on the support member and including a pair of striker parts adapted selectively to be positioned in the path of movement of a trolley on the main or branch tracks of the system when said operating linkage is stabilized at either end of its travel with said opposite terminal end in alignment with either the main or branch track terminal, and adjustable rigid spaced stop elements on said support member for said opposite terminal end of the switching track section to positively arrest the movement thereof in response to the operation of said linkage by the pivoted operator in either of two directions.

2. The structure of claim 1, wherein said stop elements comprise a pair of spaced eccentric discs on said support member near the converging main and branch track terminals and adapted for independent adjustment on their eccentric axes.

3. The structure of claim 1, and said spring-loaded over-dead-center operating linkage including a link pivoted to the support member between its ends and having lost motion pivotal connections with said opposite movable terminal end of the switching track section and the pivoted operator.

4. The structure of claim 1, and wherein said stationary support member is a plate member disposed substantially above a common plane through the main and branch tracks of the system and the switching track section, said operating linkage and pivoted operator disposed near and above said plate member and remote from said tracks, and a support element for said opposite terminal end of the switching track section and having its top connected with said linkage, and said support member having a slot through which the support element and the means connecting it to said linkage may move without interfering with the stationary support member.

5. A transfer mechanism for a trolley conveyor system comprising a relatively stationary support member and relatively stationary track sections forming parts of the system fixed to the support member in a common plane and on intersecting paths, a movable flexible track section adapted for selective alignment with individual ones of said relatively stationary track sections whereby a trolley may pass freely from one stationary track section to another in the system by passing over the movable track section while the latter is in one stabilized position, the movable flexible track section having one end portion fixed to the stationary support member, a movable carrier for the other end portion of the movable flexible track section adapted to move such other end portion selectively into alignment with one relatively stationary track section, plural stop means to arrest the movement of the movable track section in either of the two stabilized positions, a pivoted striker element in the path of movement of the trolley approaching the transfer mechanism on any of said stationary track sections, and an over-dead-center linkage having a connection with said stationary support member, pivoted striker element and said carrier and being operable responsive to engagement of said striker element by a moving trolley to shift the movable track section from one stabilized position to the second stabilized position thereof, said linkage including a first link pivoted to said stationary support member and secured to said carrier, a pivot element on the first link, a second link having a pivotal connection with said pivot element and also being pivotally secured to the stationary support member and having a second pivotal connection with the striker, and a toggle spring device having a pivotal sliding connection with the stationary support member and a pivotal connection with the pivot element on the first link.

6. The structure of claim 5, wherein the toggle spring device comprises a rod pivoted at one end to said pivot element, an element slidably and pivotally supporting an opposite end portion of the rod and being secured to said stationary support member, an abutment element on said rod, and a compression spring on the rod having its ends disposed between said element and abutment element.

7. The structure of claim 4, and a guiding lip element for said support element having sliding contact with the stationary support member near one edge of said slot.

References Cited
UNITED STATES PATENTS

| | | | |
|---|---|---|---|
| 993,695 | 5/1911 | Leith | 246—322 |
| 2,564,953 | 8/1951 | Bopp | 104—103 |

TRYGVE M. BLIX, Primary Examiner

U.S. Cl. X.R.

104—89; 246—314